J. F. SHEA.
UNIVERSAL SHEAVE.
APPLICATION FILED MAR. 10, 1911.
1,016,965.
Patented Feb. 13, 1912.
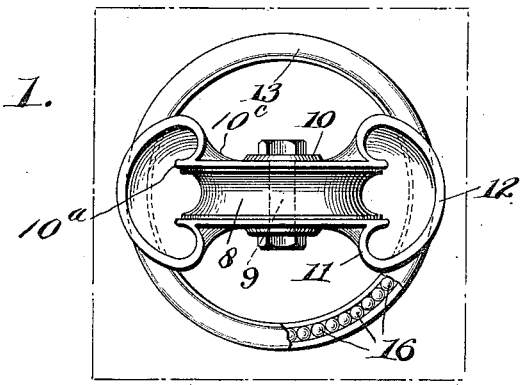
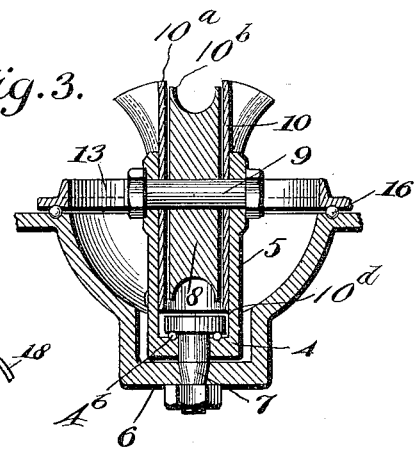
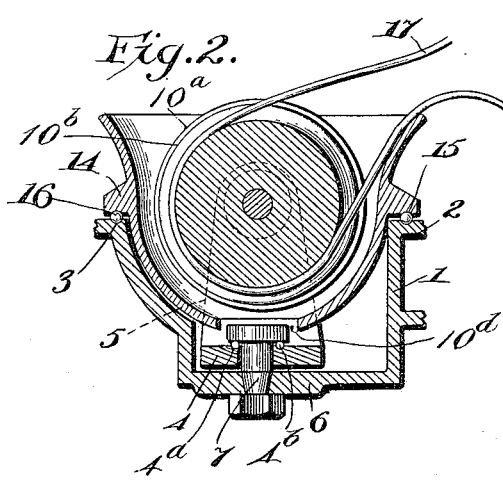

UNITED STATES PATENT OFFICE.

JOHN FRANCIS SHEA, OF TAMPA, FLORIDA.

UNIVERSAL SHEAVE.

1,016,965.  Specification of Letters Patent. Patented Feb. 13, 1912.

Application filed March 10, 1911. Serial No. 613,579.

*To all whom it may concern:*

Be it known that I, JOHN F. SHEA, a citizen of the United States, residing at Tampa, in the county of Hillsboro and State of Florida, have invented certain new and useful Improvements in Universal Sheaves; and I do hereby declare the following to be a full, clear, and exact description of the invention, such as will enable others skilled in the art to which it appertains to make and use the same.

This invention relates to improvements in pulleys or sheaves, and is of a type in which the sheave is universally mounted so that it will rotate in varying planes, and is mounted to swivel or swing around in a direction at an angle to its axis of rotation.

While the invention is particularly applicable for use where the sheave is mounted on a distant object, such for instance as a sunken vessel, still this particular invention resides in the construction and mounting of the sheave itself irrespective of its particular use.

It is well known that oftentimes in reeving a cable around a distant sheave the same is sometimes jammed or fouled, and this is especially true where the sheave should be mounted on a sunken object where the cable is more or less affected and twisted by the absorption of water, and the primary object of the present invention is to provide a sheave adapted to receive a cable in a straight line in substantially all directions of pull and guide same therearound without jamming or fouling.

It will also be understood that the sheave may be mounted, with respect to its stationary support, in any suitable way, dependent upon the use to which it is to be put, that is it may be mounted to normally be disposed upwardly, downwardly, laterally, or otherwise.

To more fully understand the invention reference is had to the accompanying drawings, in which like characters designate the same parts in the several views, but it will be understood that the same is not restricted to the exact details shown and described. For instance, in the drawings, I have illustrated one means of mounting the universal sheave, illustrating a well or casing for the reception of the sheave guard, and a ball bearing arrangement, but it will be obvious that other means of mounting may be employed.

Referring to the drawings—Figure 1 is a view in plan with a portion of the upper bearing for the upper ball race broken away to show the position of the balls thereunderneath. Fig. 2 is a vertical longitudinal sectional view, and Fig. 3 is a central vertical cross sectional view.

In the particular form of mounting, as shown in the drawings, 1 designates a well or casing forming part of a casting to be securely fixed to the deck or other part of a vessel or other object. The casing at the top is provided with a flange portion 2 having an annular groove 3 forming the lower raceway of an upper ball bearing.

Within the chamber formed by the casing 1 is mounted the universal sheave or pulley block, around which the cable reeves. In mounting the sheave a U-shaped strap is provided having a base 4, annularly grooved as at $4^a$, and the upright flat arms 5, the base 4 being swiveled to the bottom wall 6 of the casing 1 by means of the headed swivel bolt 7, provided on the underneath face of its head with an annular groove registering with the groove $4^a$ and coöperating with the balls $4^b$ to form a lower ball bearing. A pulley or sheave 8 is journaled on the axis pin 9, between the upright flat arms 5 of said strap, and interposed between the arms and said pulley is a member or guard casing for the sheave of a peculiar construction and of light material, comprising the parallel circular walls 10 bulging laterally, as at 11, forming the ridge or annular extension $10^a$ on casing, $10^b$ designating the outer edge of the sheave. The lower portion, as indicated more clearly at $10^c$, Fig. 1, is of a substantially cylindrical contour where it merges into the side disks 10, but as it projects outwardly, as at 11, it will flare upwardly in substantially semi-cylindrical contour in cross-section, as at 12, of a greater diameter than at $10^c$. The peripheral and side walls of this lower portion $10^c$ are cut away at $10^d$ to allow the head of the bolt 7 and the strap 5 to be properly seated. The flaring or bulged end portions of said sheave casing are joined by semi-annular members 13 forming with the integral ribs 14, on the outer faces of said bulged portions, an annulus, the lower face of said annulus being grooved, as at 15, to form the upper raceway of the upper ball bearing, the balls of which are designated at 16.

From the foregoing it will be seen that the weight of the pulley block construction and the sheave casing is supported by the upper ball bearing arrangement, and the lower ball bearing arrangement compensates for upward thrust or strain on the sheave, while the sheave itself is so contained within its guard or casing that the enlarged or bulged out flaring end portions are provided which enable a heavy cable to be rove around the sheave without jamming or fouling, only sufficient space being provided between the sheave and the circular walls of the sheave casing to allow the sheave to turn freely, while the bulged out flaring end portions allow of plenty free-way for the cable. At the same time the ridge 10$^a$ extending beyond and around the outer edge 10$^b$ of the pulley will guide the cable, when hauled tight, into the groove of the pulley, without extra friction or allowing it to jamb.

One particular application of the invention may be illustrated by the following:— A pilot cable is associated with the sheave, as shown in Fig. 2, one end 17 being attached to a floating buoy on board of a vessel and the other end 18 being coiled up and attached to another floating buoy, preferably of less buoyancy than the first-mentioned one. Should the vessel be sunk the buoys will be released and the pilot line fed out until the buoys arrive at the surface of the water, which will indicate the position of the sunken vessel. If the water is deeper than one-half the length of the pilot line, then the buoyancy of one float will overcome that of the other, one float only rising to the surface. The end of the pilot line secured to this buoy is then detached and the end of a heavy cable secured thereto, and upon feeding out the heavy cable the buoy on the other end of the pilot line will float to the surface, that end of the pilot line being then hauled in until the heavy cable is rove around the sheave and brought to the surface, whereupon it may be used in connection with similar cables for raising the vessel.

Having thus described a practical and preferred embodiment of the invention, the particular features of novelty will now be pointed out more succinctly in the following claims:—

1. The combination of a peripherally grooved sheave having a swiveled support, a casing for said sheave mounted to swivel therewith and comprising flat circular side walls lying adjacent the side walls of said sheave and joined by an internally concave peripheral wall forming with the sheave groove a substantially circular guideway, in cross-section, around said sheave, said concave peripheral wall bulging laterally and flaring upwardly to form opposed substantially semi-cylindrical openings projecting laterally beyond the sides of the sheave, substantially as described.

2. The combination of a U-shaped strap swiveled to a suitable support, a peripherally grooved sheave freely journaled between the walls of said U-shaped strap, a casing for said sheave comprising side walls disposed within said U-shaped strap and incasing the side faces of said sheave, said walls comprising flat circular disks joined by an internally concave peripheral wall coöperating with the peripherally grooved sheave to form a guideway of circular cross-section, said side walls at their upper ends bulging laterally and flaring upwardly to form a freeway to guide and prevent the fouling of a cable when rove therearound, substantially as described.

3. The combination of a peripherally grooved sheave having a swiveled support, and a casing for said sheave mounted to swivel therewith and comprising flat circular side members lying adjacent the side walls of said sheave, and of a diameter slightly greater than the diameter of the sheave, said casing having an internally concave peripheral wall, the lower portion of which forms a semicylindrical continuation of said ridge and the upper portion of which extends laterally and inwardly of said ridge to form laterally bulging and upwardly flaring guideways terminating at opposite peripheral sides of the sheave in openings or freeways of semi-cylindrical contour and of greater diameter than the lower peripheral wall, substantially as described.

4. The combination of a stationary support, a sheave support having a sheave journaled therein, a headed swivel pin between said sheave support and said stationary support, a casing for said sheave, comprising flat side walls and an internally concave peripheral wall bulging laterally and flaring upwardly to form enlarged semi-cylindrical openings at the top of the sheave, the lower peripheral wall of said casing being cut away to form a space for the head of said swivel pin, and a ball bearing between said sheave support and said swivel head, substantially as described.

5. The combination of a stationary support, a sheave having a support swiveled to said stationary support, a casing for said sheave mounted to swivel with said sheave and its support, means carried by said casing forming the upper raceway of a ball bearing, said stationary support being provided with a complementary raceway for said ball bearing, balls between said raceways for supporting the weight of said sheave casing and swiveled support, and a ball bearing between said swiveled support and its swivel for taking the upward thrust on said sheave, substantially as described.

6. The combination of a stationary support, a U-shaped strap provided with an annular raceway, a bolt swiveling said U-shaped strap to said stationary support, said bolt having a head provided with an annular raceway, balls in said raceways forming a bearing for taking the upward thrust of said strap, a sheave journaled in said strap, a casing in said sheave interposed between the walls of said strap and said sheave and comprising flat disks having a bulged out portion provided with a peripheral wall of substantially semi-circular contour and flaring upwardly and outwardly, annular semi-circular members joining the bulged walls of said casing and forming therewith an annulus having a ball raceway, a similar raceway being formed on said stationary support, and balls interposed between said latter raceways for forming an upper ball bearing support for said sheave and casing, substantially as described.

In testimony whereof, I affix my signature, in presence of two witnesses.

JOHN FRANCIS SHEA.

Witnesses:
H. P. BÁYA,
HEDWIGA WALICKI.

Copies of this patent may be obtained for five cents each, by addressing the "Commissioner of Patents, Washington, D. C."